United States Patent [19]

Dan et al.

[11] Patent Number: 5,572,645
[45] Date of Patent: Nov. 5, 1996

[54] BUFFER MANAGEMENT POLICY FOR AN ON-DEMAND VIDEO SERVER

[75] Inventors: Asit Dan, West Harrison; Dinkar Sitaram, Yorktown Heights, both of N.Y.

[73] Assignee: International Business Machines Corporation, Armonk, N.Y.

[21] Appl. No.: 204,038

[22] Filed: Mar. 1, 1994

[51] Int. Cl.$^6$ .................................................. G06F 13/00
[52] U.S. Cl. ............................ 395/501; 364/DIG. 1; 364/DIG. 2; 364/222.2; 364/284; 364/282.1; 364/919
[58] Field of Search ..................... 364/DIG. 1 MS File, 364/DIG. 2 MS File; 395/200.7, 200.9, 154; 348/7; 370/61

[56] References Cited

U.S. PATENT DOCUMENTS

| | | | |
|---|---|---|---|
| 5,150,472 | 9/1992 | Blank et al. ........................... | 395/425 |
| 5,341,474 | 8/1994 | Gelman et al. ..................... | 364/DIG. 1 |
| 5,442,390 | 8/1995 | Hooper et al. ............................. | 348/7 |

OTHER PUBLICATIONS

K. C. Nwosu "A Buffer Management Strategy for a Model of Digital Continuous Media Display", IEEE 13th Annual Int. Pheonix Conf. on Comp. & Comm., 12 Apr. 1994 pp. 440–447.
S. Ramanthan "Architectures For Personalize Multimedia" IEEE Multimedia, vol. 1, No. 1 Feb., 1994, pp. 37–46.
A. Dan et al, "Analytical Modelling of a Hierarchical Buffer for a Data Sharing Environ." 21 May 1991, pp. 156–167.
E. Chang et al., "Scalable Video Data Placement on Parallel Disk Arrays", 2 Feb. 1994, pp. 208–221.

*Primary Examiner*—Robert B. Harrell
*Attorney, Agent, or Firm*—Richard M. Ludwin

[57] ABSTRACT

A method for reducing the disk bandwidth capacity required by a multimedia server by selectively retaining blocks that have already been read in by one stream for re-use by another. Due to stream-dependent block buffering, the storage requirement is less than that for whole-movie buffering and because the policy is dynamic, it also adapts rapidly to changing access patterns.

10 Claims, 9 Drawing Sheets

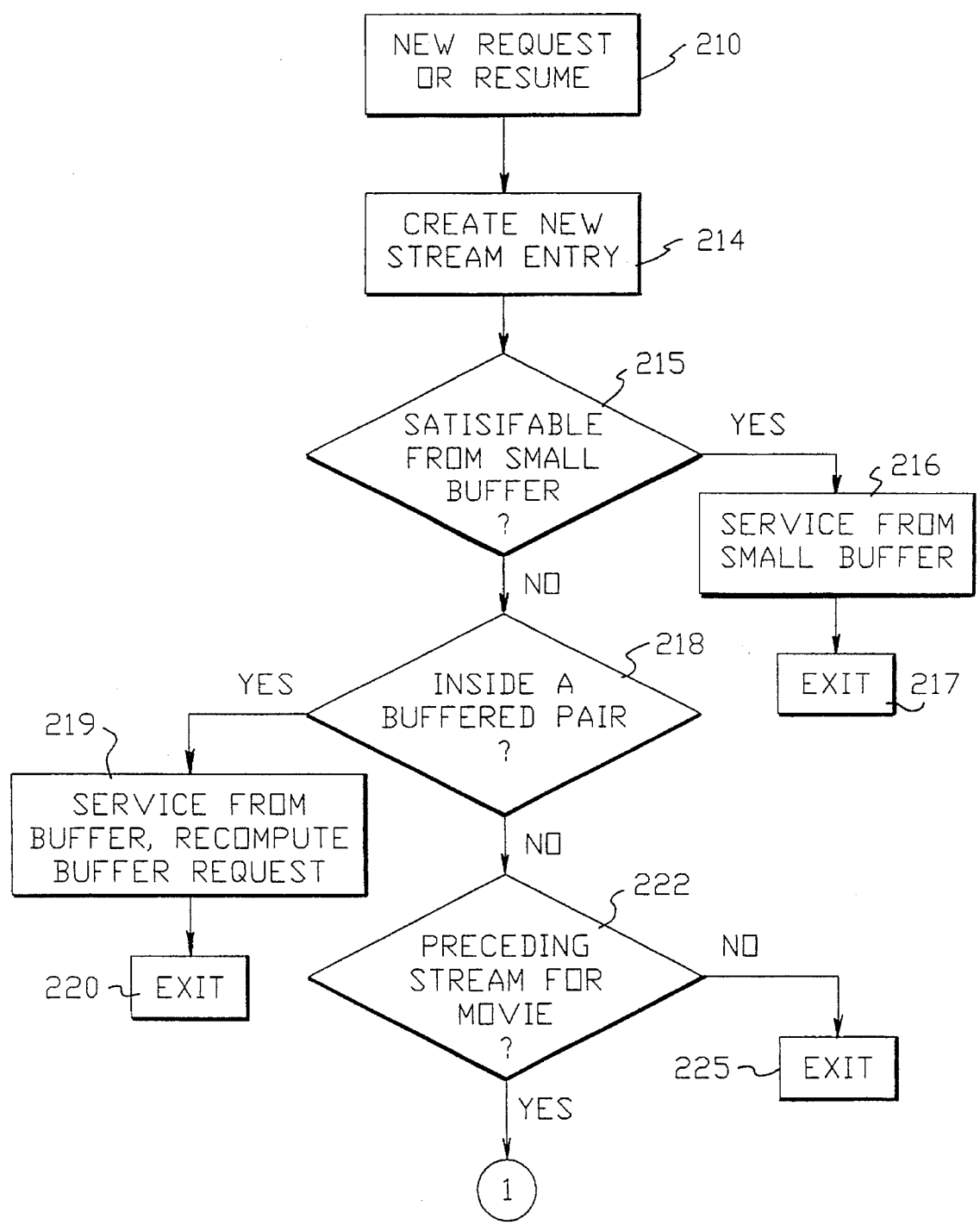

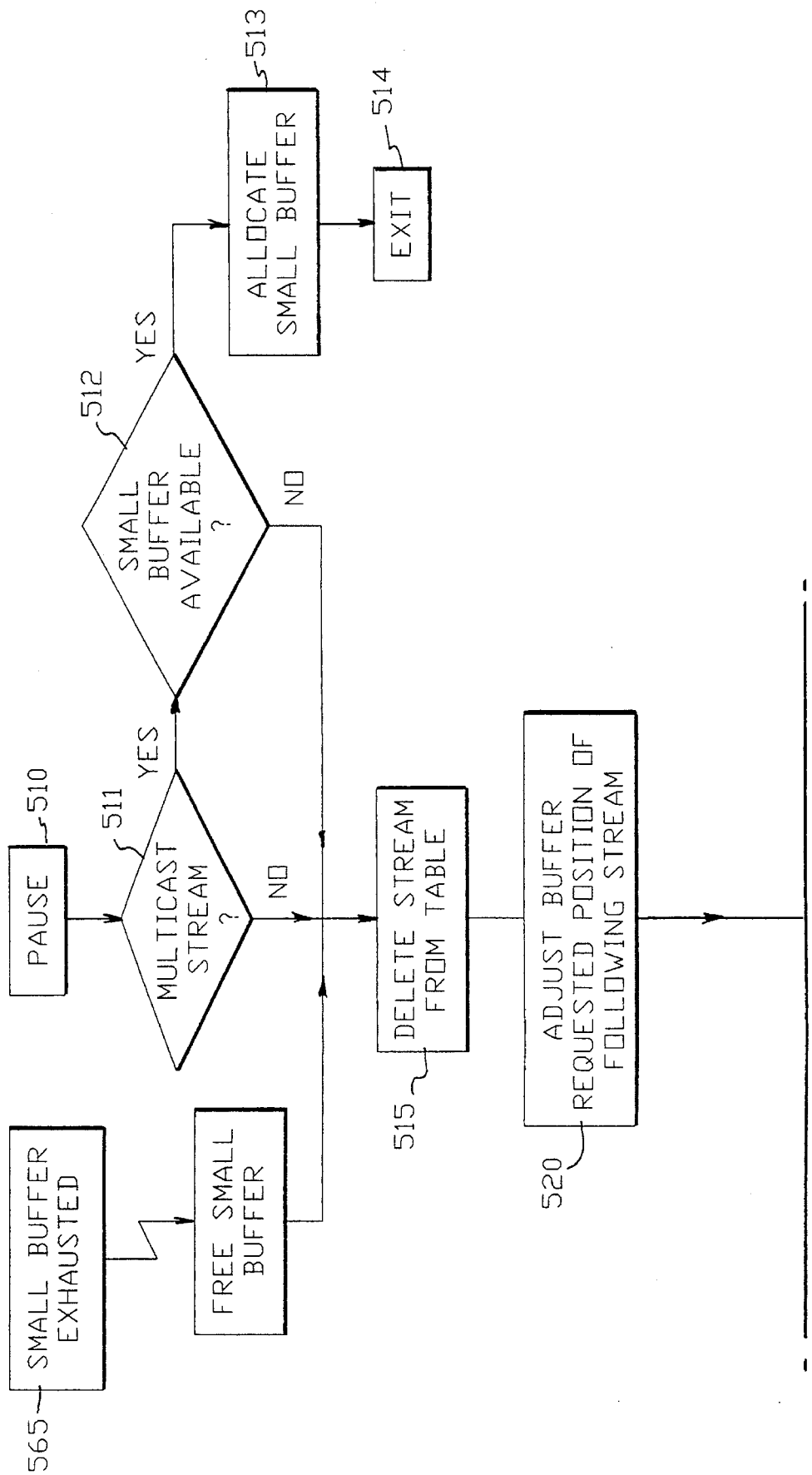

5,572,645

BUFFER MANAGEMENT POLICY FOR AN ON-DEMAND VIDEO SERVER

BACKGROUND OF THE INVENTION

1. Field of the Invention

The present invention relates to a movie (video) on demand system of the type wherein multiple clients are serviced by video streams delivered from a central video server.

2. Related Art

With the advent of digital video technology, it is feasible to provide video-on-demand services to a large number of clients over a geographically distributed network. Because of the hard real-time constraints on response time, sufficient resources are reserved on the server to guarantee continuous delivery of a video stream to the client. With a large number of users, the required disk bandwidth can be very high. With falling memory prices, efficient buffering of video data can be cost-effective in reducing the disk bandwidth requirement.

Traditional buffer management policies employed by various software systems are based upon the concept of a "hot set" of data which is much smaller in size than the total address space. Applying this concept to the video-on-demand environment is not very useful since each multimedia object (e.g. movie) is very large. Some video objects may be more popular than the others, however buffering even a small number of popular video objects requires a very large memory space. Buffering policies which operate at the block level (e.g. single page) do not make sense for the following reasons. First, the unpredictable nature of the buffer hits under an algorithm such as LRU makes it difficult for the server to guarantee continuous delivery of the stream as required for multimedia applications. Additionally, as with whole file buffering, the buffer hit probability will be very small unless a very large buffer size is used.

SUMMARY OF THE INVENTION

In light of the above, the inventors have discovered a buffer management policy that overcomes both of the above constraints. The policy is based on the following principle. For any two consecutive requests for the same movie, the later stream can read the data brought into the buffer by the earlier stream if the data is retained in the buffer until it is read by the later stream. Two streams S1 and S2 are defined as consecutive if S2 is the stream that next reads the blocks that have just been read by S1. The two streams of such a pair of consecutive streams are referred to, respectively, as the preceding and the following streams. Understanding such dependencies makes it possible to guarantee continuous delivery of the later stream with a small amount of buffer. With a larger number of concurrent streams reading the same movie, the present invention enables a video server to choose the streams to be retained so as to maximize the number of streams read from the buffer. Note that inter-arrival times are not uniform due to statistical fluctuations. The ability to choose a small set of inter-arrival times from a large set of samples enables the present invention to exploit the variation in the inter-arrival times.

In addition when multiple clients share a common retrieval stream (also referred to as multicasting) and one of the clients sends a pause request to the server, a small amount of buffer is allocated on behalf of the paused client to retain the blocks brought in by the common retrieval stream. Thus, if the client resumes within a short period of time he can be serviced from the buffer. Note that this creates a new consecutive pair wherein the preceding stream is the common retrieval stream and the following stream is the newly created stream (provided from the buffer) for the resumed client. Thus, if the client does resume within the short period of time, buffer management of the consecutive pair continues as previously described. If the client does not resume within the amount of time it takes to fill the allocated buffer, the buffer contents are discarded and the buffer is freed for other use.

BRIEF DESCRIPTION OF THE DRAWINGS

FIGS. 3A, 3B and 3C are a flow chart of the handling of a start or resume request by the buffer manager of FIG. 1;

DETAILED DESCRIPTION OF A PREFERRED EMBODIMENT

The buffer requirement for a following stream to read the data from its preceding stream is a function of the time interval between the two streams and the compression method used. Such an estimate can be obtained at the time when a new stream is created. The policy orders requests for all movies in increasing order of their buffer requirements. The policy then allocates buffer to as many of the streams as possible. The ordering of consecutive streams and allocation of buffer takes place only due to the arrival of a new stream or the changing of an existing consecutive relationship due to ending or pausing of a stream. If the buffer requirement of a newly started stream is smaller than that of a stream to which buffer has already been allocated then the buffer may be taken away from the earlier buffered stream.

Figure 1:
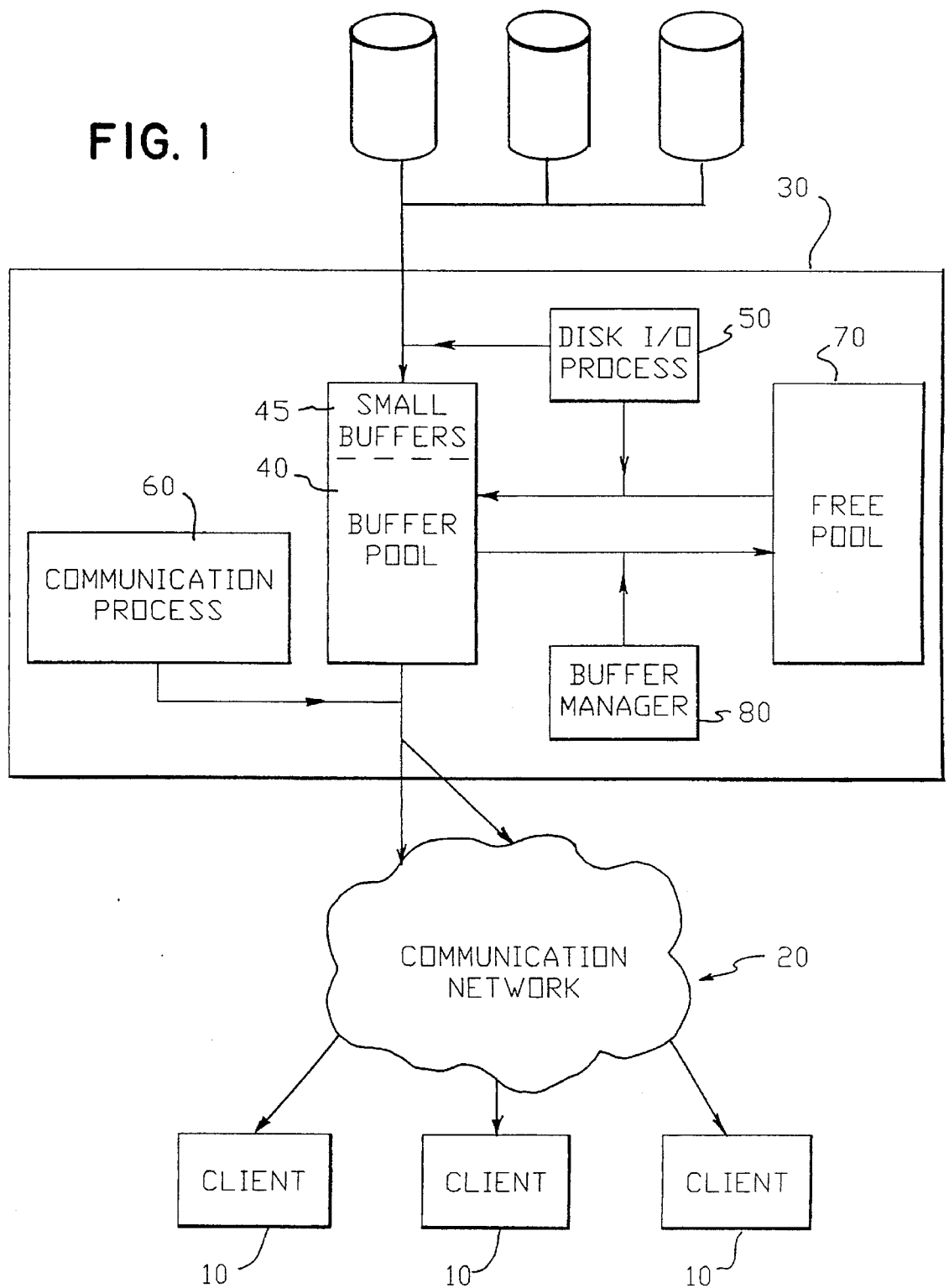
FIG. 1 is a block diagram of a video-on-demand system according to an embodiment of the present invention.

FIG. 1 is a block diagram of a video-on-demand system according to an embodiment of the present invention. It is assumed that clients 10 make requests from a video server 30 via a communication network 20. Clients can submit start, stop, pause and resume requests. The video server contains a number of components. The buffer storage is subdivided into two pools—the free pool 70 that contains free blocks that can be used for the storage of data and the buffer pool 40 that has blocks containing data ready for transmission to the users. The buffer pool contains a sub-buffer pool 45 (the small buffer pool) consisting of a collection of small buffers (e.g. each enough to hold 30 seconds worth video). The disk I/O process 50 reads video data into empty buffers obtained from the free pool 70 and inserts the buffers into the buffer pool. The communication process 60 transmits video data to the clients. The video data that has been read into the buffer for a client can be retained for re-transmission to other clients. This conserves server resources since the re-transmitted block does not have to be re-read from disk. Hence the buffer manager 80 selects a set of clients whose blocks will be retained in the buffer for subsequent re-transmission to other clients. Clients receiving re-transmitted blocks will be referred to as buffered clients and streams serving the re-transmitted blocks to the buffered clients will be referred to as buffered streams.

Figure 2:
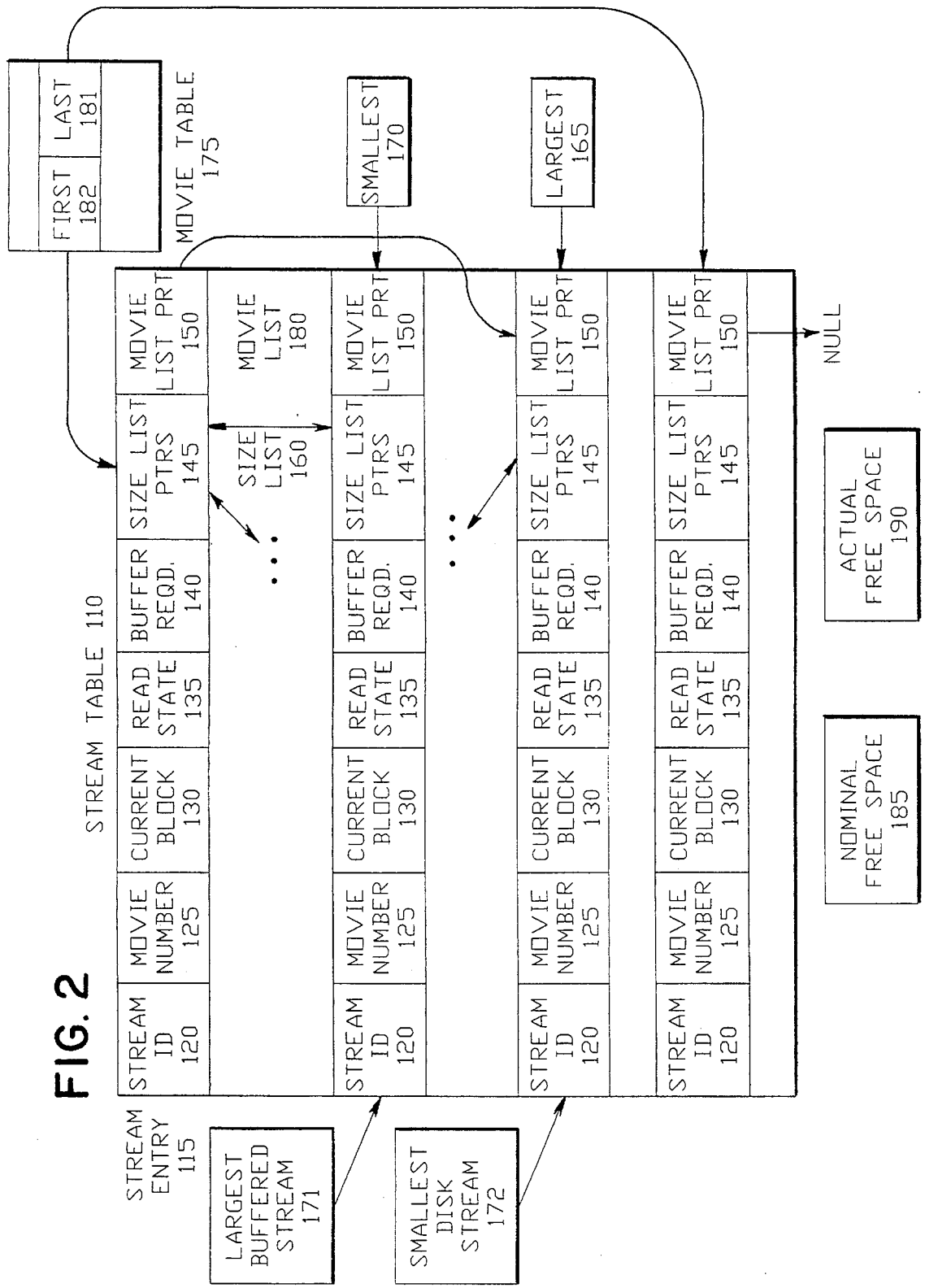
FIG. 2 shows data structures maintained by the buffer manager of FIG. 1.

As shown in FIG. 2, a number of data structures are maintained by the buffer manager. The stream table 110 contains one stream entry 115 for each movie stream currently active. The stream entry includes the identifier of the stream (Stream ID) 120, the movie identifier (Movie Number) 125, the current block being displayed (Current Block) 130, the read state of the stream (Read State) 135, the amount of buffer required to serve the stream from a buffer (Buffer Reqd) 140, size list pointers (Size List Ptr) 145 and movie list pointer (Movie List Ptr) 150. The read state 135 can take on 5 values—DISK if the stream is reading from disk, BUFFER if the stream is a buffered stream, DISK_TO_BUFFER if the stream is in the process of being switched from the disk to the buffer, BUFFER_TO_DISK if the stream is in the process of being switched from the buffer to disk and SMALL_BUFFER if the stream is reading from a small buffer. The buffer reqd. 140 is the amount of buffer necessary to store all of the blocks between the current stream and the immediately preceding stream (i.e. the difference between the current block number of the preceding stream and the current block number 130 of the current stream).

The size list 160 is a doubly linked list of all the active streams in ascending order of the buffer reqd. field. In the present embodiment, the size list 160 is formed by chaining the size list pointers 145 of all entries in the stream table. Alternatively, the size list can be provided as a separate table of stream identifiers 120 in ascending order of buffer required 140 size. The size list ptr 145 of each stream entry points to the next and previous entries in the size list. There are additional global pointers 165, 170, to the largest and smallest elements in the size list and the largest buffered stream (pointer 171) and the disk stream with the smallest buffer required 140. (pointer 172).

For each active movie, there is a movie list 180 which is formed by chaining the movie list pointers 150 of all entries in the stream table that are carrying the active movie. Pointers 182, 183 to the first and last entries of the movie list for each movie are stored in a movie table 175. The movie list is a list of all the stream entries for that movie in ascending order of current block. The movie list ptr 150 for each entry points to the next entry in the movie list.

Two counters—the nominal free space 185 and the actual free space 190 are used to keep track of the amount of buffer space available. The actual free space counter is initialized to the total amount of buffer available. The actual free space counter is used to keep track of the actual amount of buffer available. The nominal free space counter is initialized to some high fraction (such as 90%) of the total buffer space available. The nominal free space counter is used by the buffer manager when allocating and deallocating space; i.e. when allocating buffer space, the buffer manager will allocate only the amount of space specified by the nominal free space counter. This is because fluctuations in compression ratios may cause the actual amount of buffer required by a stream to vary; hence at times a stream may require more or less buffer space than allocated to it by the buffer manager. The difference between the initial values of the nominal and actual free space counters (10% in the example) is a safety buffer used for accommodating this variation.

Figure 3B:
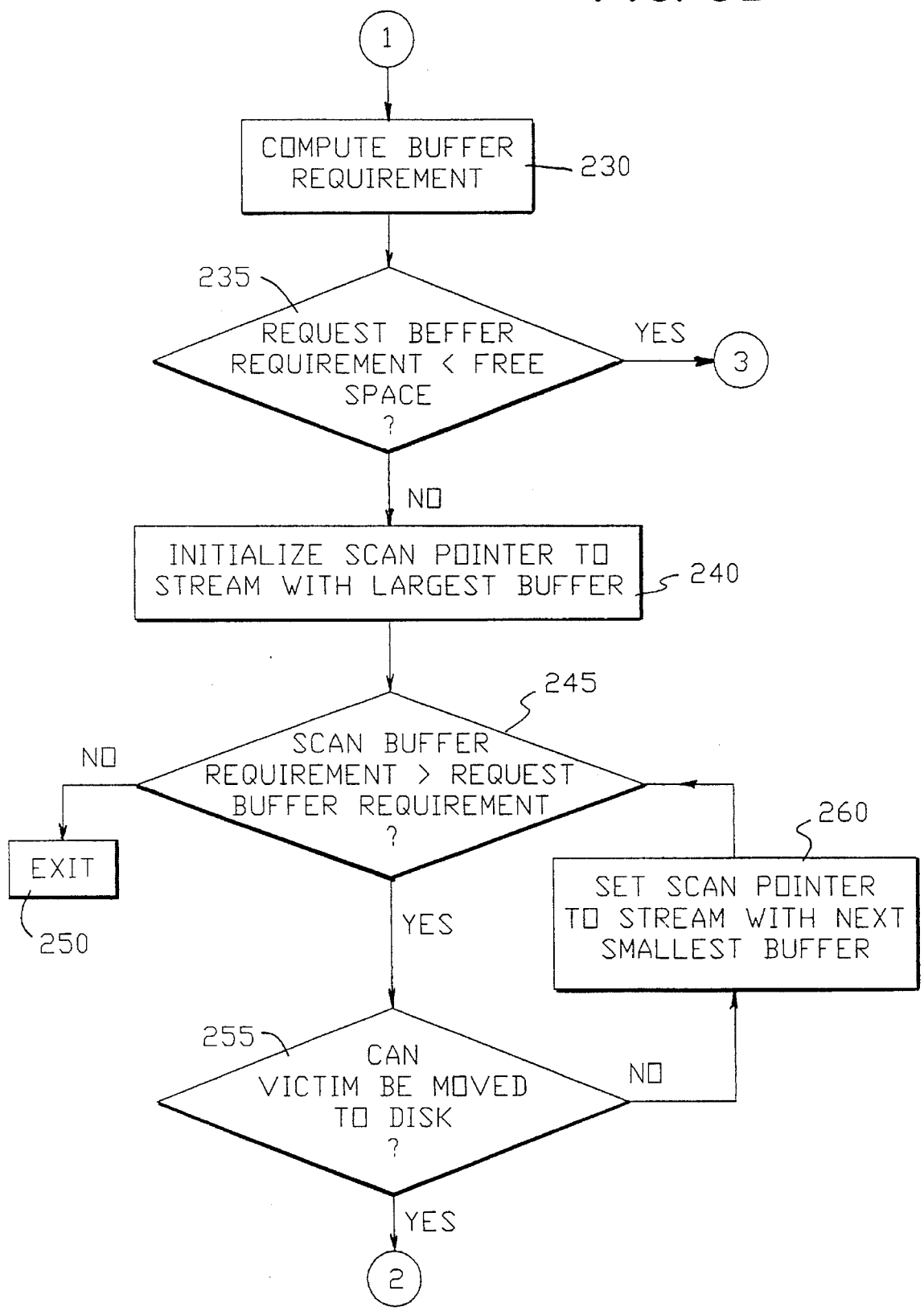
Figure 3C:
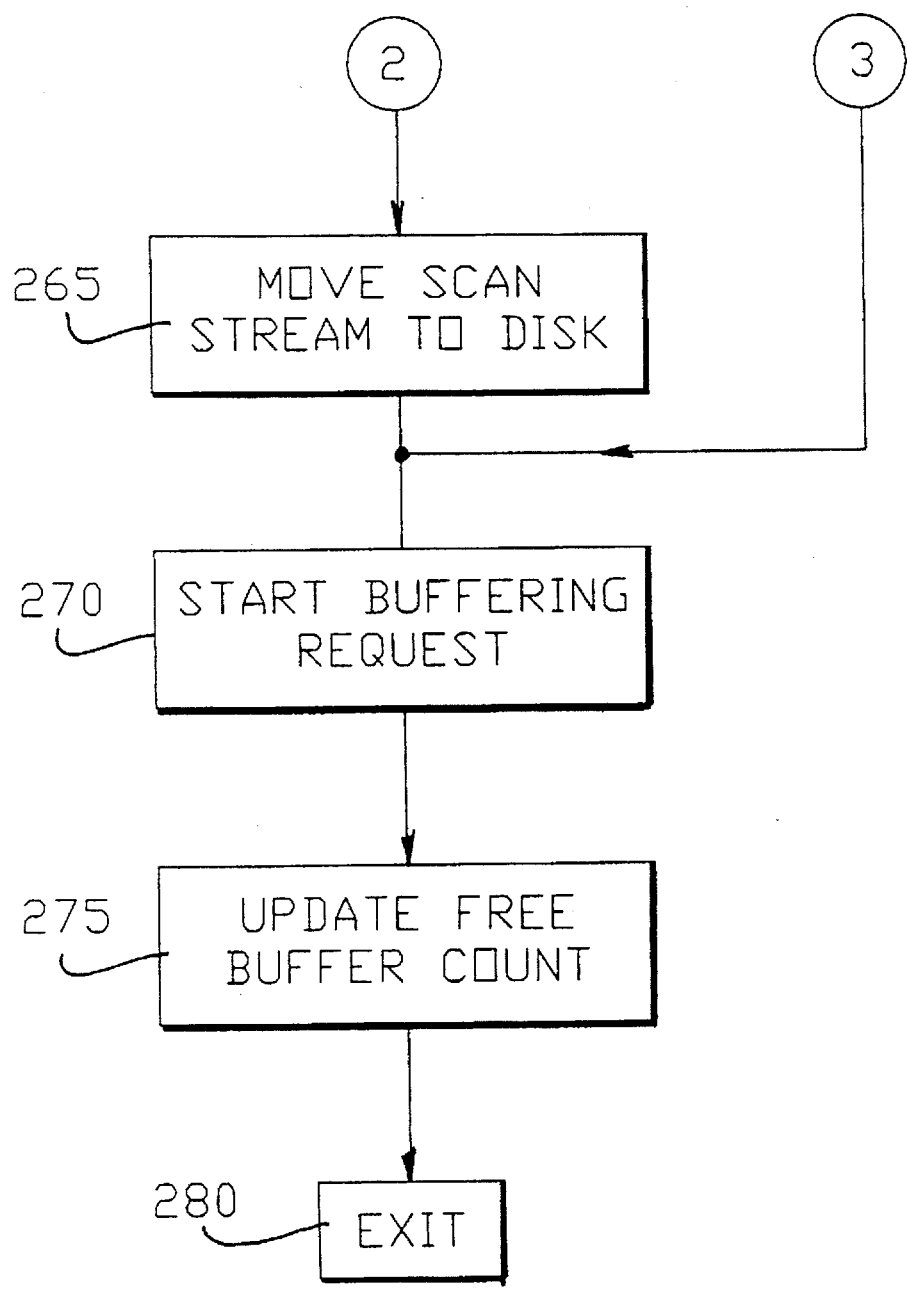

A flow chart of the handling of a start or resume request by the buffer manager is shown in FIGS. 3A–3C. If an entry does not already exist for the stream, a new stream entry is created for the request. A new stream entry 115 is created for the request in step 214 and inserted into the stream table 110. The read state of the new stream entry is set to DISK. The current block 130 is set to the requested block and the stream entry is inserted into the movie list 180 for the movie using the current block to determine its position.

In step 215, the buffer manager determines if the movie can be serviced from the small buffer pool 45 by checking the read state. If the read state is SMALL_BUFFER, the buffer manager starts servicing the movie from the small buffer pool and exits in step 217. Here the resumed stream uses data from the multicast stream in a continuous fashion by reading the stored stream data from the small buffer. If the movie cannot be serviced from the small buffer pool, in step 218 the buffer manager uses the position of the stream entry for the request to determine if the request falls between two requests where the following request is being served from a buffer (i.e. is a buffered stream). If the request falls between two requests where the following request is being served from a buffer, the current stream can also be served from the buffer. In step 219 the buffer manager recomputes the buffer reqd. field 140 of the following request as well as that of the current request, adjusts the position of the following request in the size list (by adjusting the size list pointers), sets the read state of the current request to BUFFER. The buffer manager also adjusts the pointers of the stream entry of the current request in the size list and the movie list and exits in step 220.

If the stream is not inside a buffered pair, in step 222 the movie list is used to determine the closest preceding stream if any for the movie (i.e. the stream among all the streams reading this movie whose current block is closest to the current block of this request). If no such block exists, the buffer manager task exits in step 225. If such a request exists in step 230 the buffer reqd. 140 in the stream entry is set to the amount of storage required to buffer all the blocks between the immediately preceding stream and the current request. The stream entry is then inserted into the size list 160 using the buffer reqd. field to determine its position.

Next, in step 235 the buffer manager examines the nominal free space counter 185 to determine if enough free buffer space exists to accommodate this request. If enough free buffer space exists, the buffer manager initiates the steps (270–280) necessary to buffer the request. If enough free buffer is not available, the buffer manager executes a buffer scan consisting of steps 240 to 260 to determine if this stream should be buffered by displacing some other stream. First, the scan pointer is initialized in step 240 to the largest buffered stream 171. The buffer manager then checks in step 245 if the buffer reqd. by the scanned stream is larger than the buffer required by the current request. If it is not, the buffer manager exits in step 250. If it is larger, the buffer manager checks in step 255 if the scanned stream can be moved to disk. If the stream cannot be moved, in step 260 the buffer manager examines the size list and advances the scan pointer to the buffered stream with the next smallest buffer reqd..

If the scanned stream can be moved, in step 265 its read state is set to DISK and the nominal free buffer space counter is incremented by the buffer reqd. field of the scanned stream. This effectively frees the buffer held by the scanned stream. In step 270, the buffer manager changes the read state of the request to DISK_TO_BUFFER and decrements the nominal free space counter by the buffer reqd. in step 275. In step 280, the buffer manager exits.

Figure 4:
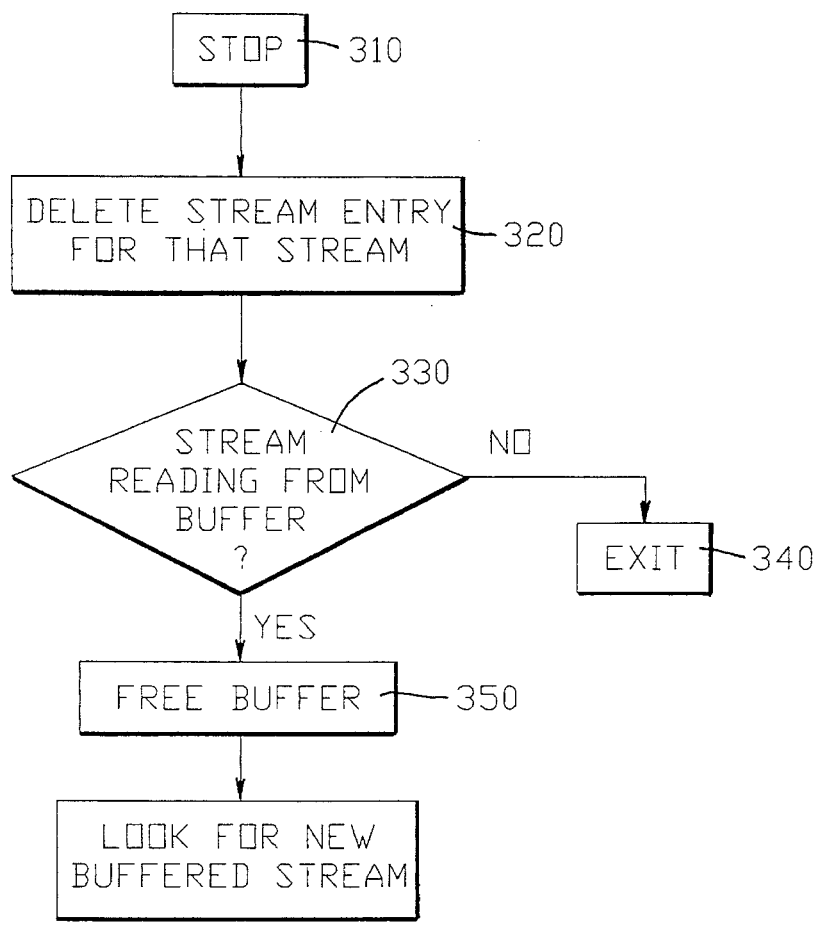
FIG. 4 is a flow chart of the actions taken by the buffer manager of FIG. 1 on receipt of a stop request.

The actions taken on receipt of a stop request are shown in FIG. 4. In step 320, the stream entry for the stream is removed from the stream table 110, the size list 160 and the movie list 175. In step 330, the buffer manager determines if the stream had allocated buffer by examining its read state 135 (BUFFER or DISK_TO_BUFFER). If not, the buffer manager exits in step 340. If the stream had allocated buffer, in step 350 the buffer manager frees the buffer by incrementing the nominal free space counter 185 by the buffer reqd. 140. The buffer manager then executes the "Look for new buffered stream" steps shown in FIG. 6.

Figure 5B:
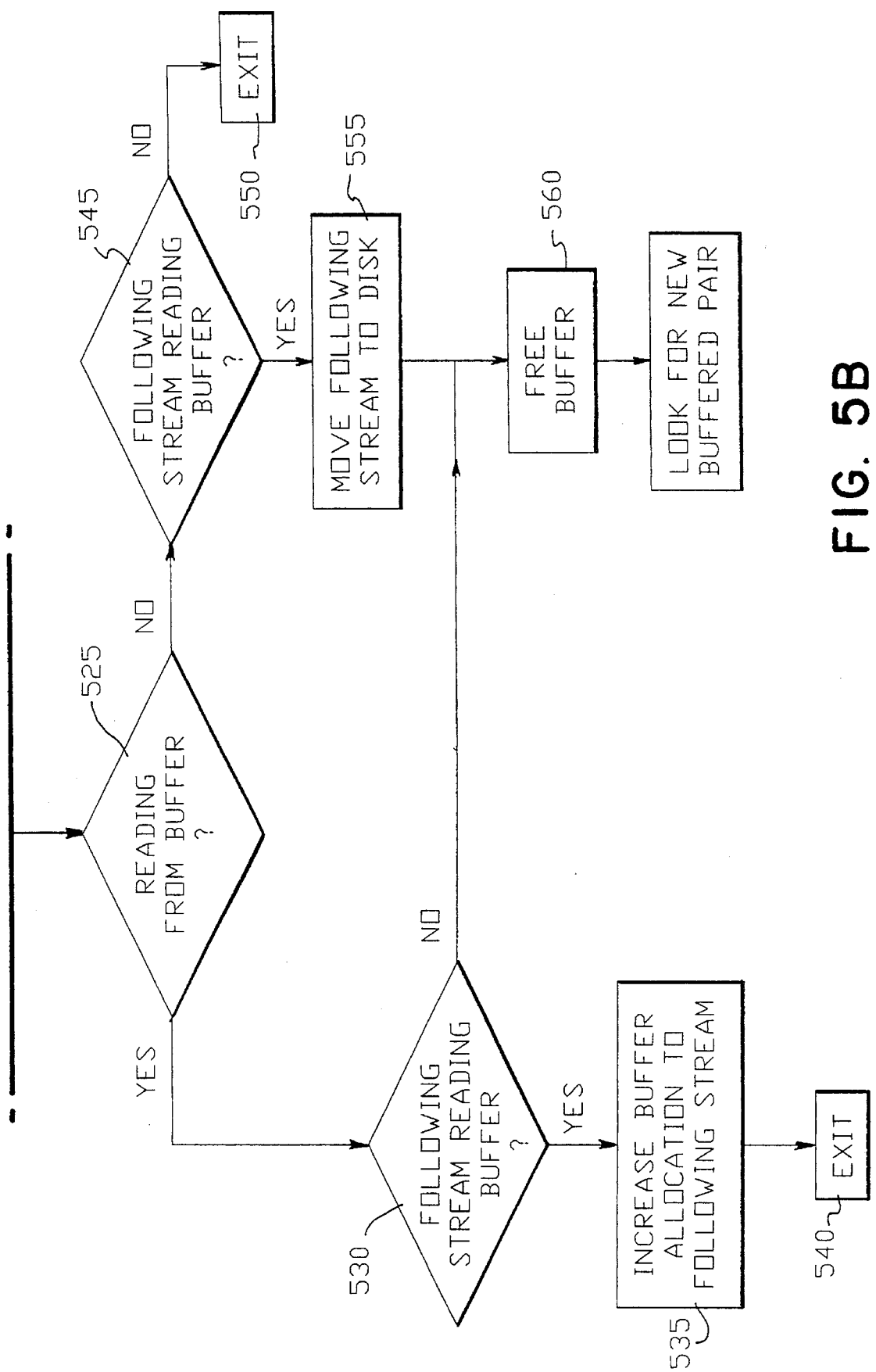
FIG. 5 is a flow chart of the actions taken by the buffer manager of FIG. 1 on receipt of a pause request.

FIG. 5 shows the actions taken on receipt of a pause request. First, in step 511 the buffer manager determines whether the stream is a multicast stream. If it is, in step 512 it checks to see if a small buffer is available in the small buffer pool. If no small buffer is available, then the buffer manager continues with normal processing in step 515. If a small buffer is available, it is allocated to the stream in step 513 and the buffer manager exits in step 514. If the stream is not a multicast stream, in step 515 the stream entry for this stream is removed from the stream table 110, and the size list and movie list pointers 145, 150 for the remaining entries are adjusted accordingly.

If the current stream had allocated buffer (read state BUFFER or DISK_TO_BUFFER), the nominal free space counter 185 is incremented by the buffer reqd.field 140 of the current stream. The buffer manager then recomputes in step 520 the buffer reqd. 140 of the immediately following stream. The position of the following stream in the size list 160 is adjusted (based upon the new value of the buffer reqd. field.) to maintain the ascending order.

In step 525, the buffer manager checks if the current stream had a read state 135 of BUFFER or SMALL_BUFFER. If the stream had such a read state, in step 530 the buffer manager checks to see if the following stream was a buffered stream (read state BUFFER, DISK_TO_BUFFER or SMALL_BUFFER). If the following stream also was buffered, the buffer manager allocates it additional buffer in step 535 by decrementing the nominal free space counter by the buffer reqd. field of the current stream and exits in step 540.If the following stream was not buffered, the buffer manager initiates the actions needed to free the buffer held by the current stream in step 560.

If the current stream did not have a read state of BUFFER or SMALL_BUFFER in step 525,the buffer manager checks in step 545 if the following stream is reading from the buffer (read state BUFFER, SMALL_BUFFER or DISK_TO_BUFFER). If it is not reading from the buffer, the buffer manager exits in step 550. If it is reading from buffer, the buffer manager moves the following stream to disk in step 555 by setting the read state to DISK. It then frees the buffer held by the following stream by incrementing the nominal free space counter 185 by the buffer reqd. field 140 of the following stream. It then executes the "Look for new buffered stream" steps shown in FIG. 6. The buffer manager continuously monitors the small buffers to determine when they are exhausted. If the small buffer allocated to a paused client is exhausted (i.e. the client did not resume within the time taken to fill the buffer), in step 565 the buffer manager frees the small buffer and executes pause processing starting at step 515.

Figure 6:
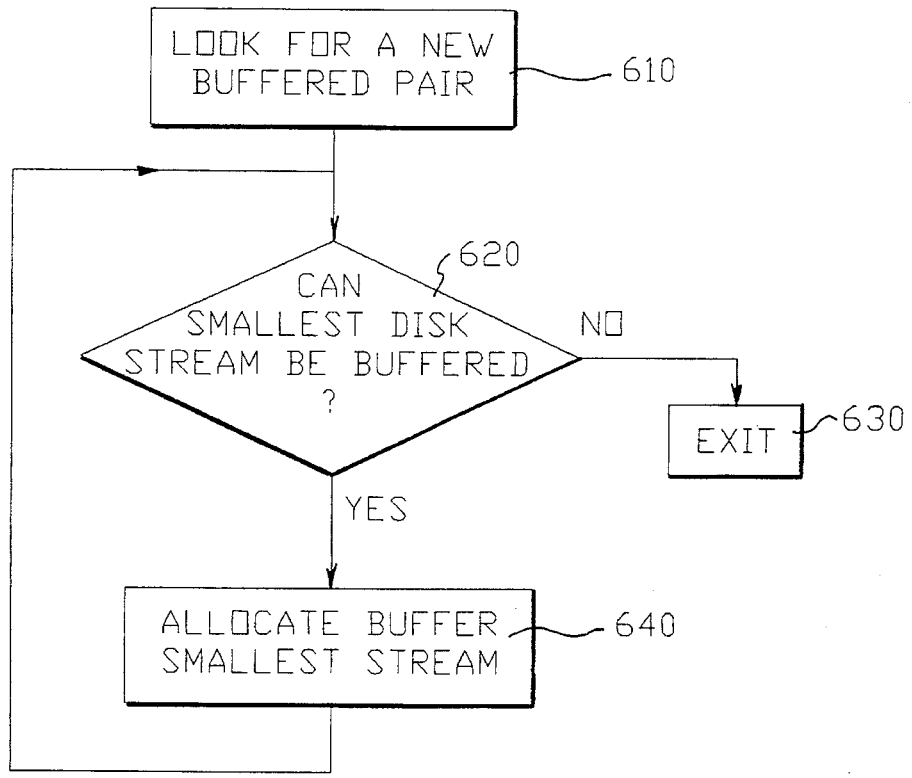
FIG. 6 is a flow chart of the steps taken by the buffer manager of FIG. 1 to find buffered streams when new buffer becomes available; and, FIGS. 7A and 7B show, respectively, the interactions between the disk I/O process and the communication process with the buffer manager of FIG. 1.

FIG. 6 shows the steps taken by the buffer manager to find buffered streams when new buffer becomes available. In step 620, the buffer manager checks to see if the smallest disk stream 172 can be buffered by comparing its buffer reqd. field 140 to the nominal free space counter 185. If the nominal free space counter is smaller, there is not sufficient buffer space,and the buffer manager exits in step 630. If there is sufficient space, the buffer manager changes the read state of the stream to DISK_TO_BUFFER, decrements the nominal free space counter by the buffer reqd. field, updates the smallest disk stream pointer and loops back to step 620.

Figure 7A:
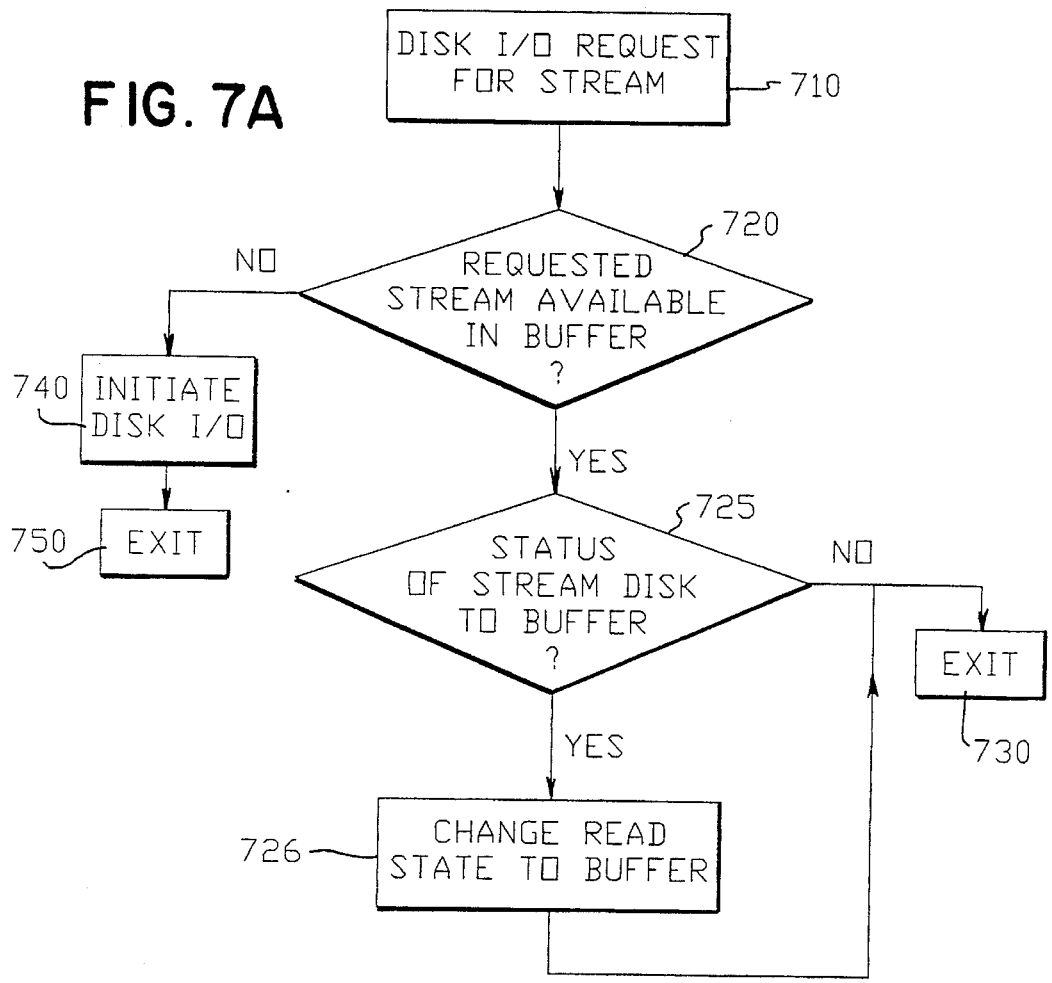
Figure 7B:
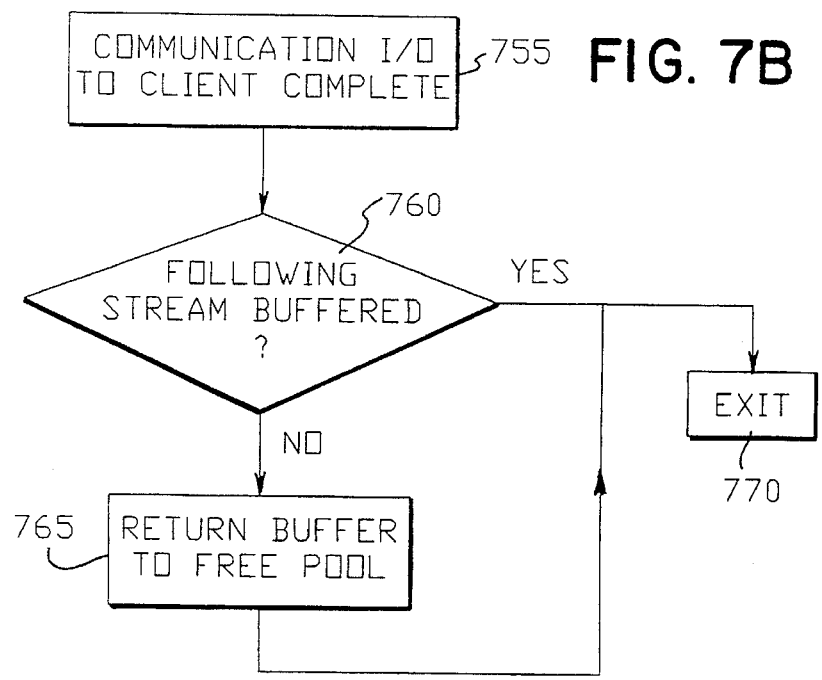

FIGS. 7A and 7B show, respectively, the interactions between the disk I/O process 50 and the communication process 60 with the buffer manager. Before initiating an I/O to read a requested block, the disk I/O process looks in the buffer pool in step 720 to see if the requested block has been read in. If it has, the disk I/O process checks the read state of the stream to see if it is DISK_TO_BUFFER in step 723. If it is not, the process exits in step 730. If it is DISK_TO_BUFFER, the disk I/O process changes the read state to BUFFER in step 726 and exits in step 730. If not, in step 740 the disk I/O process gets a free buffer from the free pool, decrements the actual free space counter starts the I/O and exits in step 750.

After transmitting a block, the communication process checks the read state of the following stream in step 760. If the read state is BUFFER or DISK_TO_BUFFER, the communications process exits in step 770. Otherwise, the process increments the actual free space counter 190 and returns the block to the free pool 70.

Now that the invention has been described by way of the preferred embodiment, various modifications and improvements will occur to those of skill in the art. Thus, it should be understood that the preferred embodiment has been provided as an example and not as a limitation. The scope of the invention is defined by the appended claims.

We claim:

1. A method of managing memory buffer in a video server, wherein a plurality of clients are served from video streams provided from disks, comprising the step of:

determining buffer requirements of a plurality of the video streams, the buffer requirements being a number of frames separating each video stream from an immediately previous video stream carrying the same video;

creating a list of streams ordered by the buffer requirements;

allocating the buffer starting from a stream with a smallest buffer requirement and proceeding to streams with larger buffer requirements until the buffer requirement of a stream can not be satisfied;

retaining blocks of the immediately previous stream in the buffer allocated to a following stream and discarding the blocks from the buffer as they are read by a client viewing the following stream;

updating the list when any of starting, stopping, pausing and resuming of a video occurs; and, responsive to the updating, reallocating the buffer starting from a stream with a smallest buffer requirement and proceeding to streams with larger buffer requirements until the buffer requirement of a stream can not be satisfied.

2. The method of claim 1 wherein a plurality of clients share a common one of the video streams, comprising the further steps of:

determining when one of the clients sharing the common one of the video streams has paused;

allocating a portion of the buffer to retain the blocks of the common one of the video streams on behalf of the client who has paused;

determining when the portion of the buffer is full;

determining when a resume request has been received from the paused client;

when the buffer is full and a resume request has not been received from the paused client for whom buffer was allocated before the buffer is full, deallocating the buffer;

when a resume request is received before the portion of the buffer is full, serving the client from the buffer and discarding blocks from the buffer as they are consumed by the client.

3. A method of managing memory buffer in a video server, wherein a plurality of clients are served from video streams provided from disks, comprising the step of:

determining buffer requirements of a plurality of the video streams, the buffer requirements being a number of frames separating each video stream from an immediately previous video stream carrying the same video; and, examining the buffer requirements and as a function thereof, allocating the buffer so as to maximize a number of streams that can be provided therefrom;

retaining blocks of the immediately preceding stream in the buffer allocated to a following stream and discarding the blocks from the buffer as they are read by a client viewing the following stream.

4. The method of claim 3 comprising the further steps of:

determining when one of the clients has paused;

allocating a portion of the buffer to retain blocks of the video streams on behalf of the one of the clients who has paused; and, when a resume request is received from the one of the clients, serving the one of the clients from the buffer.

5. The method of claim 4 wherein at least some memory buffer is locally disposed at a site of the one of the clients and wherein when the resume request is received from the one of the clients before the portion of the buffer is full, the one of the clients is served from the memory buffer which is locally disposed.

6. The method of claim 3 wherein a plurality of clients share a common one of the video streams, comprising the further steps of:

determining when one of the clients sharing the common one of the video streams has paused;

allocating a portion of the buffer to retain the blocks of the common one of the video streams on behalf of the client who has paused;

determining when the portion of the buffer is full;

determining when a resume request has been received from the paused client;

when the buffer is full and a resume request has not been received from the paused client for whom buffer was allocated before the buffer is full, deallocating the buffer;

when a resume request is received before the portion of the buffer is full, serving the client from the buffer and discarding blocks from the buffer as they are consumed by the client.

7. A method of managing memory buffer in a video server, wherein a plurality of clients are served from video streams provided from disks, comprising the steps of:

determining when one of the clients sharing one of the video streams has paused;

allocating a portion of the buffer to retain the blocks of the one of the video streams on behalf of the one of the clients;

determining when the portion of the buffer is full;

determining when a resume request has been received from the one of the clients;

when the buffer is full and a resume request has not been received from the one of the clients before the buffer is full, deallocating the buffer; and, when a resume request is received from the one of the clients before the portion of the buffer is full, serving the one of the clients from the buffer and discarding blocks from the buffer as they are consumed by the one of the clients.

8. A system for managing memory buffer in a video server, wherein a plurality of clients are served from video streams provided from disks, comprising:

means for determining buffer requirements of a plurality of the video streams, the buffer requirements being a number of frames separating each video stream from an immediately previous video stream carrying the same video;

means for examining the buffer requirements and as a function thereof, allocating the buffer so as to maximize a number of streams that can be provided therefrom; and, means for retaining blocks of the immediately previous stream in the buffer and discarding the blocks from the buffer as they are read from the buffer by a client.

9. A method of managing memory buffer in a system, wherein a plurality of data consumers are served from data streams provided from at least one storage device, comprising the steps of:

determining buffer requirements of a plurality of the data streams, the buffer requirements being a number of data blocks separating each data stream from an immediately previous data stream carrying the same information; and based on the buffer requirements, allocating the buffer so as to maximize a number of data streams that can be provided therefrom.

10. A method of managing memory buffer in a system wherein a plurality of data consumers are served from data streams, comprising the step of:

determining buffer requirements of a plurality of the data streams, the buffer requirements being a number of data blocks separating each data stream from a previously commenced data stream carrying the same information;

allocating the buffer starting from a data stream with the smallest buffer requirement and proceeding to data streams with larger buffer requirements until the buffer requirements of one of the data streams can not be satisfied;

retaining blocks of a previously commenced data streams in the buffer allocated to a corresponding subsequently commenced data stream carrying the same information; and, servicing a data consumer from the subsequently commenced data streams using data blocks provided by way of the buffer.

* * * * *